United States Patent [19]
Guichard et al.

[11] Patent Number: 5,097,330
[45] Date of Patent: Mar. 17, 1992

[54] HIGH DEFINITION TELEVISION TRANSMISSION AND RECEPTION SYSTEM WITH REDUCED DATA THROUGHPUT

[75] Inventors: Philippe Guichard, Verrières Le Buisson; Mohammad-Rèza Haghiri, Sceaux, both of France

[73] Assignee: U.S. Philips Corporation, New York, N.Y.

[21] Appl. No.: 465,089

[22] PCT Filed: May 19, 1989

[86] PCT No.: PCT/NL89/00037
§ 371 Date: Mar. 20, 1990
§ 102(e) Date: Mar. 20, 1990

[87] PCT Pub. No.: WO89/11767
PCT Pub. Date: Nov. 30, 1989

[30] Foreign Application Priority Data
May 20, 1988 [FR] France .................. 88 06788

[51] Int. Cl.⁵ .............. H04N 7/12; H04N 7/04; H04N o7/18
[52] U.S. Cl. ...................... 358/135; 358/105; 358/136; 358/141
[58] Field of Search ............. 358/105, 135, 136, 140, 358/141

[56] References Cited
U.S. PATENT DOCUMENTS

| 4,575,756 | 3/1986 | Furukawa | 358/136 |
| 4,717,956 | 1/1988 | Moorhead et al. | 358/135 |
| 4,727,422 | 2/1988 | Huiman | 358/133 |
| 4,862,259 | 8/1989 | Gillard et al. | 358/105 |
| 4,965,667 | 10/1990 | Trew et al. | 358/105 |

FOREIGN PATENT DOCUMENTS
0160547 11/1985 European Pat. Off.
87/04034 7/1987 PCT Int'l Appl.
87/05770 9/1987 PCT Int'l Appl.

OTHER PUBLICATIONS
"Television Motion Measurement for Data and Other Applications"; Thomas; Research Department Report, BBC, Sep. 1987, pp. 1-20.

Primary Examiner—John K. Peng
Attorney, Agent, or Firm—Michael E. Marion

[57] ABSTRACT

In order to reduce the digital data throughput, the transmission system comprises means for determining, for each image, in the set of speed vectors, a subset containing the vectors which are encountered most frequently in this image, and means for digitally transmitting, once per image, the characteristics of all the vectors of this subset, and if the speed vector of an image part to be transmitted is an element of the subset, it is defined by reference to the subset, while, if it is not an element of the subset, another transmission mode is used for the current image part, being a mode in which the speed vector is not used, but in which the analog video data are transmitted with a lower spatial definition but with a higher frame rate.

9 Claims, 3 Drawing Sheets

HIGH DEFINITION TELEVISION TRANSMISSION AND RECEPTION SYSTEM WITH REDUCED DATA THROUGHPUT

BACKGROUND OF THE INVENTION

The present invention relates to a high definition television transmission system, in which the image is divided into a plurality of parts, for each one of which a video data transmission mode is selected from among at least two modes which differ from one another by the sampling structure, and to a high definition television receiver to represent images transmitted by such a system, in which the image is divided into a plurality of parts, for each one of which a video data reproduction mode is determined from among at least two modes on the basis of an indication received from the transmitter in digital form.

The invention is applicable to the system referred to as DATV (Digitally Assisted Television), in which data complementary to the video data are transmitted by digital means. The purpose of such a system is to reduce the pass band of the video channel.

A system of this type is known from the paper entitled "Motion compensated interpolation applied to HD.MAC pictures encoding and decoding" by M. R. Haghiri and F. Fonsalas, presented at the "2nd International workshop on signal processing of HDTV", L'Aquila, Feb. 29-Mar. 1988.

SUMMARY OF THE INVENTION

In the proposed system, the signal to be transmitted is generated by a 50 Hz camera with interlaced image of 1152 lines with 1440 pixels per line. This signal is assumed to be sampled at 54 MHz; this is four times the frequency indicated in the recommendation 601 of the CCIR. The purpose of the encoding is to reduce the pass band of the transmitted signal by a factor of 4, with an associated digital data throughput which is as small as possible. To this end, the image is divided into a plurality of parts, in this case squares of 16×16 pixels, and use is made, for each part, of a transmission mode selected from among three, each one of these modes being characterized by the range of speeds (of the movements in the image) to which it is applicable, and by the duration of transmission of a complete image. An "80 millisecond" mode exhibits an image frequency of 12.5 Hz and is applicable to the virtually fixed image parts. A "40 millisecond" mode exhibits an image frequency of 25 Hz and is applicable to speeds extending as far as a far pixels per image. A "20 millisecond" mode exhibits an image frequency of 50 Hz and is applicable to the image parts where the objects have the highest speeds.

Moreover, in the 40 ms mode, a speed vector is transmitted, this being valid for the image part considered, which permits the receiver to create an intermediate image between two effectively received images.

If consideration is given only to the "40 ms" and "20 ms" modes, the first (40 ms) modes corresponds to the determination and to the transmission, via a digital channel of a speed vector for each one of the image parts, while in the second (20 ms) mode the image frequency is higher than in the first mode but with a lower spatial definition. Moreover, data for defining the selection effected for each of said parts are transmitted over the digital channel.

The determination and the transmission of a speed vector permit the use of the 40 ms mode for higher maximum speeds. As a result of this, the number of bits required to transmit the value of the local speed is greater, and this transmission consumes a significant part of the digital transmission capacity, and may even exceed it. In order to reduce the digital throughput, the transmission system according to the invention advantageously comprises means for determining, for a complete image, in the set of speed vectors, a subset containing the vectors which are encountered most frequently in this image, means for digitally transmitting the definition of all the vectors of this subset, each speed vector being defined by referring to the subset, and means for selecting, for each part of the image, either the first mode if the speed vector of the image part to be transmitted is an element of the subset, or the second mode if the speed vector of the image part to be transmitted is not an element of the subset.

Moreover, in the receiver, there are advantageously provided a memory to store at each image a plurality of speed vectors and means for finding, in this memory, the characteristics of a speed vector corresponding to an image part, on the basis of a reference received from the transmitter for this image part.

The invention is thus based on the observation that, as will be explained in greater detail hereinbelow with reference to the figures, the subset of the most frequent speed vectors of an image comprises the majority of the vectors determined in the image, and that the loss of definition resulting from the exclusion of the vectors which do not form part of this subset is limited as it is then possible to revert to the second mode for the image parts concerned, while the gain in respect of the digital transmission throughput is large, on account of the fact that the number of vector references necessary to define the said subset is small.

It is possible to note that the document "Television motion measurement for DATV and other applications, Research Department report" published by "the British Broadcasting Corporation" under the reference BBC RD 1987/11-UDC 621.397.3, mentions the use of a limited set of speed vectors to be tried for an image. Nevertheless, the system described by this document is different from the system of the present invention: in particular, the speed vectors are determined in a previous step by a method of "spatio-temporal differentiation" which provides, on a surface representing the coordinates of the possible speed vectors, peaks at the coordinates of the speed vectors encountered in the image or the image part. The limitation of the number of the speed vectors to be tried is obtained by taking into account only the peaks, the height of which exceeds a determined threshold, and not by a statistical method. Moreover, instead of determining the exact speed vector in complete freedom, in order then to analyse its inclusion within a set, the system presented in this document proceeds from a limited set of vectors and investigates which one is the most satisfactory or the least inappropriate. This method may lead to large errors in the case of erratic movements in an image, since in these circumstances the least inappropriate vector of the set is nevertheless not satisfactory. In this case, since the mode referred to as the "2nd mode" in the present description is not provided for in the system of this document, when a movement exhibits a speed for which no vector of the set is genuinely appropriate, it is only possible either to revert to another method of measurement of the speed or to interpolate the speed on the basis of the adjacent image parts, or to add vectors to the set. In all cases, this leads to a process which is complex and which exhibits the disadvantage that its duration of execution is not predictable. The application according to the present invention of a subset of vectors which is determined statistically, in a system employing the two modes defined hereinabove, does not exhibit any of these disadvantages, and in particular permits the throughput to be constant and fixed in advance.

In a modified embodiment which procures a supplementary reduction of the digital throughput, the system according to the invention is moreover characterized in that it is equipped with means for, after having transmitted the definition of the vectors of the subset for an image, transmitting for the following image only the definition of variation vectors each representing the variation of one of the speed vectors in relation to the preceding image, while the receiver is equipped with means for storing the speed vectors of each one of the image parts, and means for adding to these vectors, in the memory, quantities representing, for each image, the variations in relation to the preceding image.

Moreover, by applying to the variation vectors the same concept as that employed for the speed vectors, a new reduction of the throughput may again be obtained, on account of the fact that the system comprises means for determining, in the set of the variation vectors of said following image, a subset containing the variation vectors which are encountered most frequencly in this image, means for transmitting digitally the definition of all the variation vectors of this subset, each variation vector being then defined by reference to this subset, and means for selecting, for each part of this image, either the first mode if the variation vector of an image part to be transmitted is an element of this subset, or the second mode if the variation vector of the image part to be transmitted is not an element of this subset, while the receiver comprises a memory to store at each image a plurality of variation vectors, and means for finding, in this memory, the characteristics of a variation vector corresponding to an image part, on the basis of a reference received from the transmitter for this image part.

BRIEF DESCRIPTION OF THE DRAWINGS

The description which will follow, with reference to the accompanying drawings describing non-limiting illustrative embodiments, will provide a good understanding of how the invention may be implemented.

DETAILED DESCRIPTION OF THE PREFERRED EMBODIMENTS

The purpose of the system described here by way of example is to transmit images emanating from sources defined by 1152 lines per image height, and 1440 pixels per image width, by using only one video pass band corresponding to that of a 625-line standard (576 useful lines of 720 pixels).

In order to permit the reconstruction of a part of the missing video information, digital data are associated with the video data.

For the transmission of the video signals, three different modes are employed.

In an "80 ms" mode, with the aid of an appropriate digital filtering, the transmission takes place first of all, for example, during a period of 20 ms, of the odd pixels of the odd lines, during the following 20 ms of the odd pixels of the even lines, during the following 20 ms of the even pixels of the odd lines. and then finally of the even pixels of the even lines, the time employed to transmit an image totally thus being 80 ms. Nevertheless, during each period of 20 ms, the entire surface of an image is described; this permits compatibility with the old 625-line standards. By appropriately recombining the pixels described in the course of four consecutive periods of 20 ms each, it is possible to recreate a high definition image. In order to do this, it is necessary that the source image should virtually not have varied in the course of the 80 ms. Accordingly, this mode is applicable to fixed or quasi-fixed images.

In a "40 ms" mode, still after appropriate filtering, transmission takes place, for example, only of the even lines, all the pixels of which are transmitted on two occasions. During a period of 20 ms, the transmission takes place of the odd pixels, and then during the following period, of the even pixels (it would also be possible to contemplate the transmission of only one pixel in two, but for all the lines). Accordingly, one half of the definition has been lost, but the image is described in 40 ms, that is to say twice as rapidly, which permits certain movements.

In this "40 ms" mode, a speed vector is moreover available for each image part. The measurement of the speeds in each image part is independent of the process of transmission of the values of the speeds. The document of the conference at L'Aquila mentioned hereinabove describes a mode of measurement of the speeds, and the document BBC RD 1987/11 describes several other modes. It is possible, for example, in the construction described here, to proceed from a source image part, to displace this part by a determined quantity, to measure the difference (by a method of least squares applied to the luminance of the pixels) with the same part of the following source image, and thus to test all the possible displacements; after this, the one which leads to the smallest difference is adopted.

Figures 1, 2, 3:
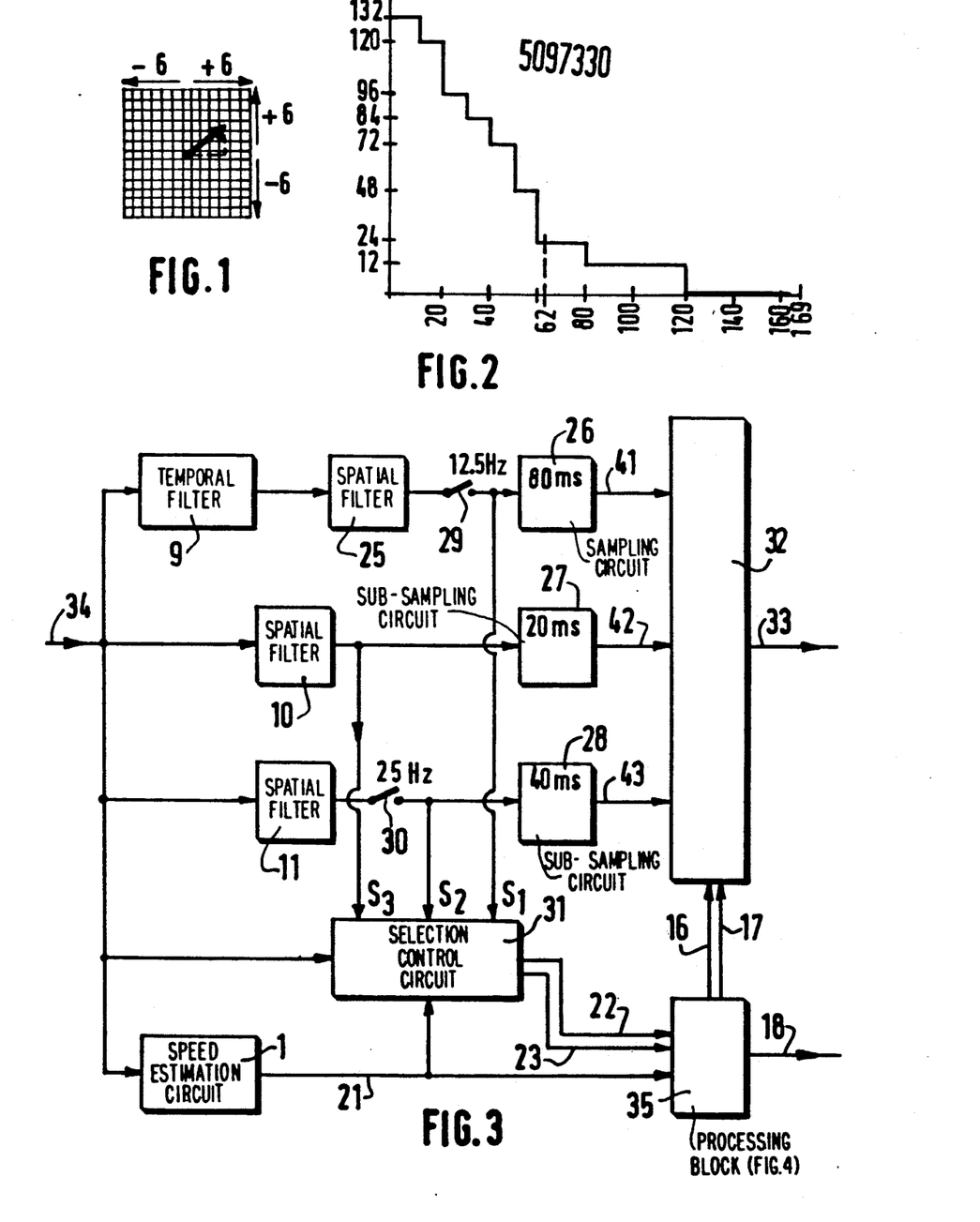
FIG. 1 illustrates a mode of definition of a speed vector.
FIG. 2 represents an occurence frequency histogram of the speeds in an image.
FIG. 3 is a block diagram of the assembly of encoding circuits of a transmission system.

FIG. 1 shows a speed vector, which represents the displacement of an object in 20 ms, and which has in this case coordinates $x = +4$, $Y = +3$ expressed in pixels/20 ms. If a requirement is imposed not to process coordinates greater than $\pm 6$ pixels/40 ms, each displacement to be tested corresponds to the distance between the central pixel at the origin of the vector and one of the pixels which are represented by one of the squares of a checker pattern of $13 \times 13$; this represents 169 tests. This method becomes progressively more demanding when the number of displacements to be tested increases, but, as this process is implemented on transmission, that is to say where the equipment is present on one example only, a great complexity is not very troublesome, where the receivers themselves remain simple.

The speed vector permits the creation in the receiver of an intermediate image and the temporal insertion thereof between two transmitted images. In order to create an intermediate image, a start is made from a transmitted image, and the movable parts are displaced therein along the appropriate speed vector, which is indicated by the transmitter. It is also possible to make use of the two images between which a supplementary image is to be inserted. For further details on the manner of recreating this image, it is possible to refer to the publications mentioned in the preamble. By virtue of the image thus added, there is a further doubling of the temporal definition of the image; this permits the use of this mode even when high speeds are present in the image. Nevertheless, the intermediate image is correct only if the speeds are stable or quasi-stable. In the opposite case, where high accelerations are present, use is made of a third, "20 ms" mode.

In this "20 ms" mode, the transmission takes place only, during a period of 20 ms, of for example the odd pixels of the odd lines, and in the course of the following 20 ms the transmission takes place, in an identical manner, of a new image. Thus, the temporal definition is excellent, on account of the fact that the image repetition rate is 50 Hz; this permits the transmission of all the movements without blur effects or jerky movements effects. On the other hand, the spatial definition is low (only one pixel in four has been transmitted) and corresponds to that of the 625-line standard. This is not too troublesome, since the eye is less sensitive to the absence of spatial definition when the objects observed move rapidly.

The image is divided into parts, for example in this case sequences of 16×16 pixels, and for each one of these parts or "blocks", a different mode may be used. Further, in the case of movable objects in front of a background landscape, the latter will be able to be described with all its details in the 80 ms mode, while within polygons formed of squares of 16×16 pixels and surrounding the movable objects most closely, a 40 ms or 20 ms mode will be locally used.

Moreover, in order to simplify the processing of the data, it is appropriate to process the sequences of images within the framework of invariable time intervals of 80 ms, and not to divide these 80 ms into more than two intervals.

There are thus only five possible cases, when an interval of 80 ms is to be filled:
1—with a single "80 ms" image
2—with an "40 ms" image followed by two "20 ms" images
3—with two "20 ms" images followed by a "40 ms" image
4—with two "40 ms" images
5—or with four "20 ms" images.

Each interval of 80 ms is processed as an independent whole, that is to say independent of the adjacent intervals. For each interval of 80 ms, the definition of the possibility used from among the five cases described hereinabove, as well as data associated with each one of the modes, must be transmitted to the receivers. The necessary number of bits depends upon the number of possible situations: the first case 1 corresponds to a single situation. It is the same for the case 5. On the other hand, in the cases 2 and 3 whichn comprise a "40 ms" mode, it is necessary to transmit the value of the speed vector as well.

Let us assume, first of all, that the invention is not implemented. Let it be assumed that there is a speed vector with a maximum amplitude (in each vertical/horizontal direction) of ±6 pixels per period of 20 ms. This corresponds to $13^2 = 169$ possible vectors, i.e. 169 possible situations (see FIG. 1).

In the case 4, it is necessary to define two vectors (one for each one of the two periods of 40 ms); this corresponds to 169 first vectors × 169 second vectors, i.e. $169^2$ situations.

The total number of situations corresponding to the five cases is the sum of the situation in each case, i.e.:

Case 1: 1
Case 2: 169
Case 3: 169
Case 4: $169^2 = 28561$
Case 5: 1
Total 28901

One situation from among 28,901 can be defined by means of 15 bits.

These 15 bits must be redefined for each one of the parts of the image. If these parts are squares of 16×16, in an image of 1440×1152 pixels, there are 6480 parts. Moreover, there are 12.5 intervals of 80 ms per second. In total, a throughput of 15 bits × 6,480 squares × 12.5 intervals × 1,215,500 bits/second will be necessary. This throughput is greater than that which it is intended to allocate to this type of information in, for example, the D2 MAC packet standard (approximately 1 Mbit/s during the field returns).

There is therefore an obligation, in the prior art, to limit the vectors to ±3 pixels. In fact, there are then for each square $7^2=49$ possible vectors, and in total to described the five cases: $1+49+49+49^2+1=2,501$ situations, which 12 bits can describe. The throughput is then $12 \times 6,480 \times 12.5 = 972,000$ bits/sec, which is acceptable. However, it is regrettable to limit the magnitude of the speed vectors which can be used to the detriment of the quality of the image. An attempt was therefore made to find a means of transmitting vectors of ±6 pixels/20 ms, or even larger still, with a maximum available digital throughput of approximately 1 Mbit/second.

To this end, once the speed has been determined for each one of the 6480 image elements, a statistical processing is carried out, by means of a logic processor, in order to determine an appearance frequency histogram of the speed vectors. FIG. 2 represents an entirely arbitrary example of a speed histogram. In each image part, it is possible to encounter 169 different vectors: the horizontal scale is therefore graduated in 169 divisions. The vertical scale represents the number of the occurrences for each one of the 169 vectors in a complete image. The vectors have been grouped in tens in order to facilitate the analysis of the occurrences: it is clear that, in reality, the "steps" of the histogram are ten times finer (one per vector). It should particularly be noted that the horizontal scale does not represent the magnitude of the vectors, the latter being classified from left to right by decreasing appearance frequency.

According to the invention, the determination is thus made of a subset of vectors which are most frequently encountered. For example, it is possible to take the 62 vectors furthest to the left on the histogram. In this case, they correspond to 5568 occurrences of the 6480 which are included in an image (6480 is the number of the image parts), and it has been assumed, in order to trace the histogram, that all the squares were processed in the "40 ms" mode.

The characteristics of these 62 vectors are transmitted only once per image. They may be defined by a 13×13 matrix (corresponding to the chequer pattern of FIG. 1) in which "ones" are present for the vectors adopted and "zeros" for the vectors eliminated. Such a matrix can be transmitted by means of 169 bits per 40 ms image, i.e. 338 bits at most per interval of 80 ms, for the two images of the case 4.

In each image part, a definition is then given of the vector by reference to the subset of the 62 vectors, by indicating, for example, the number of its rank in the initial description. For example, by reading the matrix in a predetermined order, the vector number 1 corresponds to the first "one" encountered, and so on.

There are therefore, for each one of the cases "2" or "3": 62 possible situations, in place of 169, and in accordance with a computation similar to that carried out hereinabove, the sum of all the possible situations for an image part during an interval of 80 ms is:

| | |
|---|---|
| Case 1: | 1 |
| Case 2: | 62 |
| Case 3: | 62 |
| Case 4: | $62^2$ |
| Case 5: | 1 |
| Total | 3970 |

A situation can therefore be defined in 12 bits. The throughput per interval of 80 ms is then 12 bits×6480 parts, plus the 338 initial description bits, that is to say 78,098 bits, i.e. 976,225 bits/second; this is compatible with the capacity offered by the field returns of the D and D2MAC-packet standards.

For the image elements of which the vector does not form part of the subset of this vector, use is made of the "20 ms" mode. This corresponds, according to the histogram of FIG. 2, to 980 occurrences, i.e. only 14% of the image parts. Moreover, the absence of these vectors which have not been transmitted does not necessarily correspond to a degradation of the image: in fact, if the invention had not been used, there would have been an obligation, in order to respect the maximum possible throughput, to limit the length of the vectors to ±3 pixels/20 ms, and all the image parts exhibiting a longer vector would have had to be processed in the "20 ms" mode, and the number thereof would probably have been even greater.

The example given hereinabove with a selection of 62 vectors capable of transmission corresponds fairly well to the use of the maximum capacity of the digital channel. Nevertheless, this example is pessimistic. In fact, it is very frequent that numerous image parts have the same speed vector. The clearest example is that of a panoramic view of a landscape at infinity: all the image elements have the same speed vector. In the event of translation of objects of large dimensions, all the image parts covered by this object also have the same speed vector. As a result of this, the histogram of the vectors classified by occurrence frequency is frequently far more concentrated in the left-hand part than that of FIG. 2, and the number of vectors eliminated is even smaller.

It is also necessary to note that the procedure described hereinabove is simplified, since nothing prevents the selection of a maximum number of transmissible vectors which is different in each one of the cases 2, 3 and 4. Likewise, nothing prevents the selection of the subsets of contents which are different in each one of the cases, even if the number of transmissible vectors is identical. The only quantity which is imposed by the digital throughput capacity is $N_2+N_3+N_{41}\times N_{42}$, using the designations N2, N3, N41 and N42 respectively to represent the number of vectors adopted to be transmitted in the "40 ms" image of the case 2, in the "40 ms" image of the case 3, and in the first and then the second "40 ms" image of the case 4.

Proceeding from the statement of the occurrence frequencies of the vectors corresponding to each one of the cases 2 to 4, it is easy to imagine, on the basis of the general knowledge of a person skilled in the art in the field of mathematics, procedures for minimizing the sum $N_2+N_3+N_{41}\times N_{42}$, which are matched to the sequence processed.

A supplementary advantage of the invention is that the size of the vectors is no longer limited. In fact, if the capacity of definition of a vector is increased, it is solely in the course of the initial description of the vectors, once per 40 ms, that this increase in capacity is applicable. Let us assume that, for example, it is desired to transmit a vector of ±15 pixels at most; this implies a 31×31 matrix in place of 13×13. It would then be necessary to transmit 961 bits per interval of 40 ms in place of the 169 mentioned hereinabove; this represents a negligible increase of only 9900 bits per second.

According to a supplementary feature of the invention, it is further possible to gain on the digital throughput by the following measure: in the case 4, there are two successive images in the "40 ms" mode in a same base interval of 80 ms; the first one of these two images is transmitted in the manner described hereinabove, and on the other hand, so far as the second image is concerned, for each one of the vectors selected in the first image as a function of their greater appearance frequency, the transmission takes place of only the variation in relation to the preceding image. These variations, which have vertical and horizontal components, are therefore vectors, referred to as variation vectors.

In the first example given hereinabove with reference to FIG. 2, there are 62 vectors maintained as compared with 169 possible ones for the first image. With speed vectors of ±6 pixels, it is possible to pass, for example, from a vector −6 to a vector +6, i.e. a variation of +12, and consequently the maximum amplitude of the variation vectors for the second image is ±12 pixels per 20 ms in each direction (horizontal and vertical). The set of possible variations is therefore constituted by a 25×25 matrix, i.e. 625 possibilities. However, most of the time, the speeds develop little from one image to another: an object launched at a certain speed in general maintains this speed during at least a certain time. Accordingly, the variation vectors are in general, of low amplitude; as a result of this, they require few bits for their transmission. Moreover, among the set of variation vectors, there are a certain number of subsets constituted by equal vectors. Thus, it is possible to apply to the variation vectors the same technique as that used for the speed vectors: they are classified by order of appearance frequency, and then only the subset containing the most frequent variation vectors is retained, and the transmission takes place, once per second image (of 40 ms) of the case 4, of the initial description of these variation vectors, and then, for each square of 16×16 pixels, each variation vector is defined by its rank in the subset. By adopting the example described hereinabove with reference to FIG. 2, it is possible to assume that among the variations of the 62 vectors maintained for the first 40 ms image only the 14 different variations which are most frequently encountered are transmitted. In these circumstances, the initial description of 14 vectors from among 625 possible ones consumes 625 bits for the second period of 40 ms of the case 4 (in place of 169). It should be noted that in this case, instead of transmitting the "ones" of the 25×25 matrix, as in the case of the 13×13 matrix explained hereinabove, it is more advantageous to transmit the description of each vector of the subset. As each one of these can be described by ten bits, there is in these circumstances the consumption of fourteen times ten bits (i.e. 140 bits instead of 625) for the initial description of the 14 vectors adopted.

The number of possible situations per interval of 80 ms for each square of 16×16 is: frequent, a change is then made back to the case 2.

FIG. 3 represents a block diagram of an encoding system on transmission, in order to define the context of the invention as well as its material situation.

The images arrive sequentially, in accordance with a line scanning, on the connection 34. They are processed simultaneously be three parallel channels, respectively (9, 25, 29, 26), (10, 27), (11, 30, 28).

The "80 ms" channel comprises, in cascade, a temporal filter 9, a spatial filter 25, a switch 29 at 12.5 Hz, and a sampling circuit 26 performing a "sub-sampling", that is to say a sampling at one quarter of the frequency which corresponds to the complete definition of the pixels. This branch describes a complete image in 80 ms.

The "20 ms" channel comprises, in cascade, a spatial filter 10 and a sub-sampling circuit 27, sampling a complete image in 20 ms. This channel describes a complete image, with low definition, in 20 ms.

The "40 ms" channel comprises a spatial filter 11 as well as an interrupter 30 at 25 Hz and a sub-sampler 28. It transmits an image every 40 ms.

The input signal 34 is also conducted to a circuit 1 for the estimation of the speed vectors, which computes the speed corresponding to each one of the image parts as defined hereinabove. This circuit 1 indicates the value of the speed vectors on the connection 21.

A selection control circuit 31 receives at the same time the instantaneous description of the image by the connection 34, the speed vectors by the connection 21, and the instantaneous description supplied by each one of the three channels on its inputs $S_1$, $S_2$, $S_3$. This complex circuit compares with the source image 34 the images supplied by each one of the three channels, by using moreover the speed vector in the case of the "40 ms" channel, this taking place for each image part (squares of 16×16 pixels). The channel, the image of which is the closest to the source image, is selected, a specific selection being made for each one of the squares.

For the sake of simplification, different delays which must be introduced in practice for various reasons have not been represented, the clearest reason being that, in order to have available the complete "80 ms" image and to compare it, it is necessary to wait until the fourth of the four successive periods of 20 ms has been received, and that, in order to apply a correction correctly by means of the speed vector, it is necessary to have available the two images temporarily framing the current image. As a result of this, the control circuit 31 simultaneously supplies on the connections 22, 23 respectively two decisions concerning two successive images in the 40 ms mode from the same interval of 80 ms, these being images which will be designated "−1" and "0".

The reference 35 designates a block in which the invention is implemented and which comprises, in particular, elements for the correction of the decisions emanating from the circuit 31. The speed vectors are supplied to it by the connection 21, and the initial decisions by the connections 22, 23. The corrected decisions are supplied on the connections 16, 17, and the digital elements to be transmitted on the connection 18.

Depending upon the corrected decisions 16, 17 and on the basis of the signals 41, 42, 43 supplied by the three channels, a multiplexer 32 transmits the selected channel on the analogue output 33 having a compressed pass band.

With the exception of the block 35, all these elements form part of the prior art, and a more detailed description, in particular with regard to the processes of filtering and of sampling, is provided by the documents mentioned in the preamble, and also by the document "An HD-MAC coding system" by F. W. P. VREESWIJK et al., presented at the L'Aquila conference on Feb. 29–Mar. 3, 1988, and by the European Patent Application No. 89,200,887.1 filed earlier by the Applicant.

Figure 4:
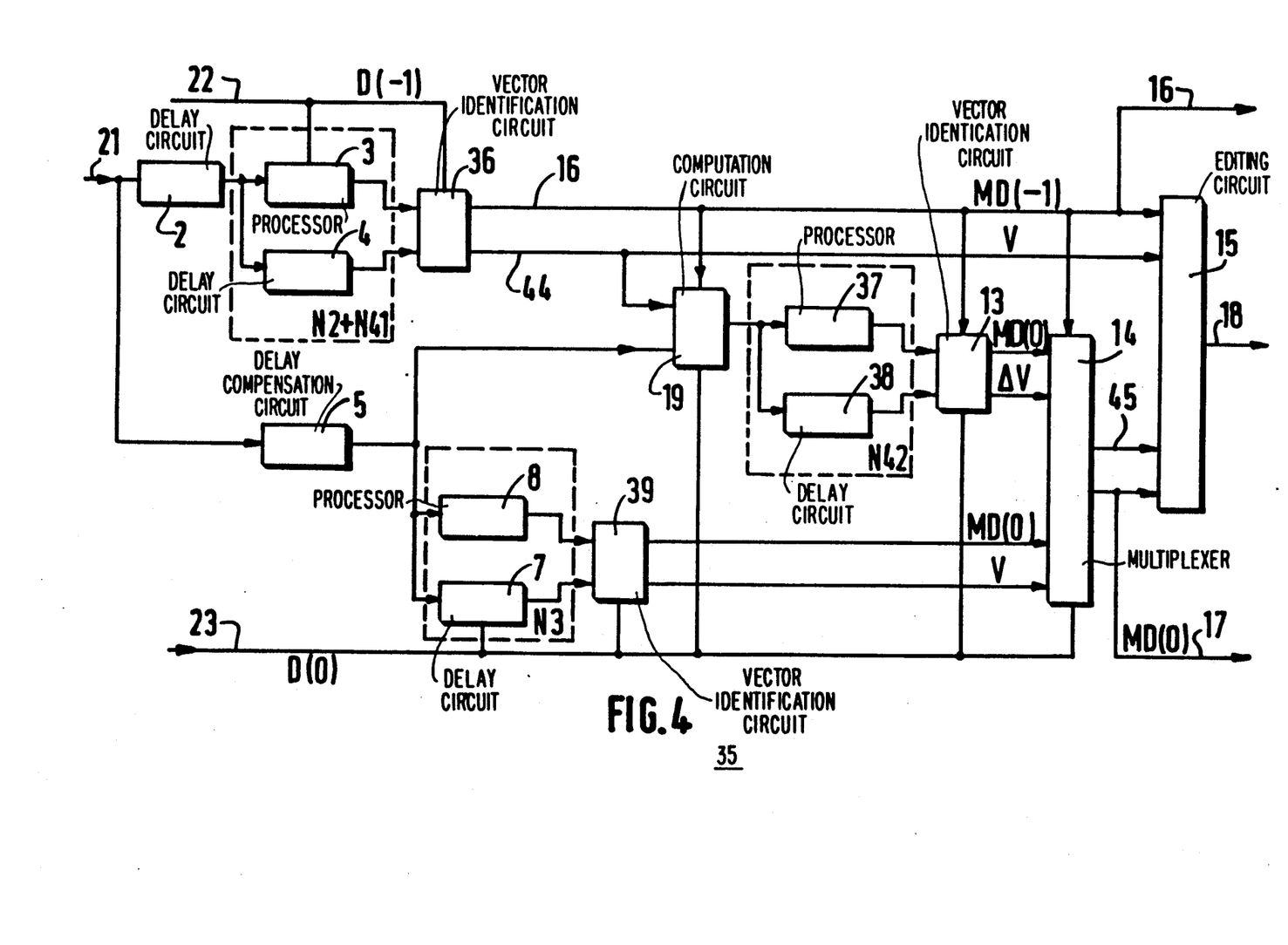
FIG. 4 is a detailed block diagram of the circuit elements serving for the implementation of the invention.

The block 35 will now be described in greater detail with reference to FIG. 4. As described hereinabove, the initial decisions corresponding to the images 0 and −1 are available on the connections 22, 23 respectively and the speed vector on the connection 21.

The speed vector signal passes through a circuit 2 contributing a delay of 40 ms, in order to place each vector of the image 0 in phase with that of the image −1. A circuit 3 receives this delayed speed vector and also the decision D(−1) of selection of one from among the three channels, concerning the image −1. The circuit 3 is a processor element which, following the complete description of an image, establishes a classification of the speed vectors by order of occurrence frequency, and supplies to an element 36 the description of the subset of the most frequent vectors. The speed vector signal present at the input of the circuit 3 is transmitted to the element 36 by a delay circuit 4, which corresponds to the time employed by the processor 3 in order to establish the classification. The element 36 determines whether the speed vector transmitted by the circuit 4 forms part of the subset delivered by the processor 3. If this is not so, the decision D(−1) is possibly modified to impose the selection of the "20 ms" channel. The signal representing the modified final selection MD(−1) is supplied on the connection 16. If the "40 ms" mode is selected (the speed vector forms part of the subset), the number of the corresponding speed vector is supplied on the connection 44. The selection effected by means of the elements 3, 4, 36 is that concerning the first "40 ms" image of an interval of 80 ms, that is to say that it supplies one of the data items, the number of which has been referred to hereinabove, either N2 or N41.

By means of a circuit 5 for compensation of a delay corresponding to the duration of the various processings executed in the elements 3, 4, the speed vector is conducted to the elements 7, 8 and 19. The decision D(0) concerning the image 0, on the connection 23, is also conducted to the processor element 7 and to an element 39. The outputs of the elements 7, 8 are also conducted to the element 39. The assembly of the elements 7, 8, 39 is identical, from the structural and functional point of view, to the assembly of the elements 3, 4, 36 respectively. The element 39 thus supplies a corrected decision MD(0) concerning the image 0, and a speed vector V, which are conducted to the circuit 14. These data items are one of those, the number of which has been referred to hereinabove: N3.

The selected speed vector of the image −1, on the connection 44, and that available at the output of the delay compensation circuit 5 are both conducted to the circuit 19, which computes the speed variation when the decisions MD(1) and D(0), on the connections 16 and 23, correspond to the case 4. These variation vectors are supplied to the elements 37, 38 exactly as the speed vectors are supplied to the elements 3, 4 or 7, 8 respectively. These elements are constituted and operate in the same manner and supply to the element 13, which is identical to the elements 36 or 39, the description of the most frequent variation vectors. This circuit determines whether the variation vector transmitted by the delay circuit 38 forms a part of the subset described by the processor 37. Based on the decisions MD(−1) and D(0), it then determines the final decision MD(0), which is possibly modified. The latter is supplied to the circuit 14 together with, if required, the current variation vector ΔV.

The circuit 14 is a multiplexer which supplies at the output on the connection 17 the final selection MD(0) for the image (0), selected from among its two inputs MD(0), depending on whether case 3 or case 4 is applicable. It supplies on a connection 45 the speed vector or the variation vector, depending upon the particular case.

The editing circuit 15 receives, on the one hand, the description of the subsets of speed vectors and of variation vectors to be transmitted once per period of 80 ms, and then, for each image part, the decition MD(−1) and the decision MD(0), as well as possibly a current vector (on the connections 44 and 45), it edits these data and supplies them on the output 18 to be transmitted in accordance with a predetermined format on the digital transmission channel.

Figure 5:
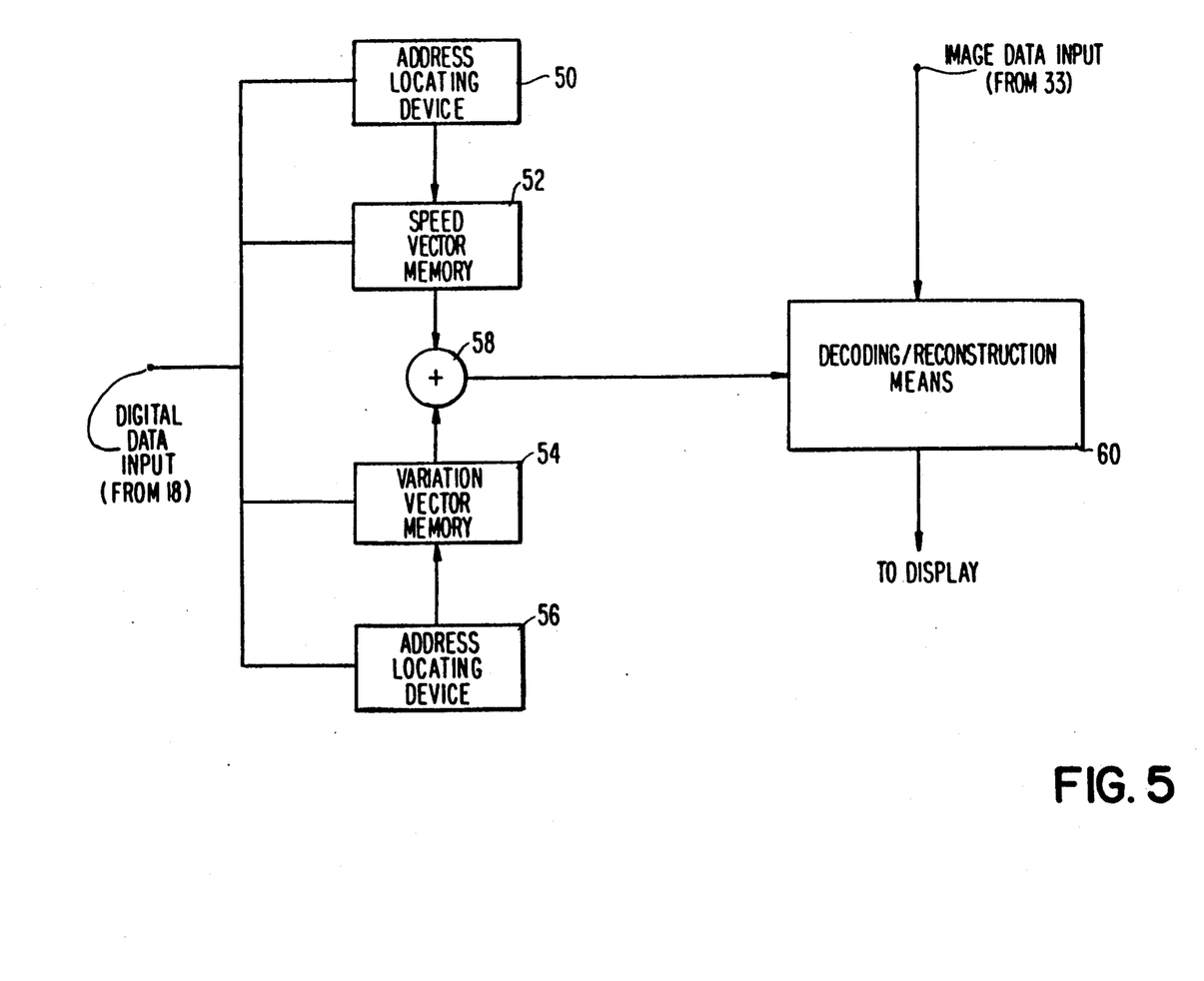
FIG. 5 is a block diagram of a receiver comprising circuit elements implementing the invention.

A receiver to reproduce images transmitted according to the invention is shown in FIG. 5. It comprises the circuits of the prior art known to a person skilled in the art, and, in particular, means for decoding the digital data permitting it to know, for each image part, which is the case selected on transmission, convolution and switching means permitting it to reconstruct, at each instant, the image in correpondence with the transmission mode, and also means for, in the "40 ms" mode, recreating an intermediate image between two transmitted images. These circuits are shown collectively as decoding/reconstruction means 60.

In addition to these circuits, it comprises a memory 52 and/or a memory 54 in which the speed vectors of a "40 ms" image and/or the variation vectors of the following "40 ms" image respectively are recorded, and an addressing system comprising address locating devices 50 and 56 which, on the basis of a reference received from the transmitter through the digital channel 18 for each one of the squares of 16×16 pixels, permits the reading, in the memories 52 and 54, of the coordinates of a speed vector or of the variation vector respectively. It is possible to record therein the variation vectors and then subsequently, for each square, to read the speed vector and the variation vector and then to add them to one another in adder 58. It is also possible, for each description of a variation vector received from the transmitter, to read in memory the corresponding speed vector (that concerning the same square of the preceding image), to add these two vectors to one another, and to return the sum to memory in place of the initial speed vector. This saves memory positions, but assumes that the description of the variation vectors of the second image takes place only after reproduction of the first image is terminated.

In any event, if the transmitter transmits, for the second image, the variation vectors of a subset which is less numerous than that of the speed vectors of the first image, there will be no search for a missing vector in memory for the squares of the second image which have not given rise to the transmission of a variation vector, since a signal designating for them the "20 ms" mode will have been received from the transmitter.

We claim:

1. A high definition television transmission system in which an image is divided into a plurality of image parts and wherein a video data transmission mode is selected for each of said image parts from at least two sampling modes which differ from one another, said sampling modes comprising a first mode operating a first image frequency and in which a set of speed vectors is determined for a group of said image parts processed thereby, and a second mode operating at a second image frequency which is higher than said first image frequency, and wherein said speed vectors and data identifying the mode selected for each of said image parts is transmitted on a digital channel, said system comprising:
   a) means for identifying within said set of speed vectors, a subset of vectors comprising those speed vectors which are most frequently determined in said first mode;
   b) means coupled to said identifying means, for digitally transmitting the characteristics of each of the vectors comprising the subset; and
   c) means for selecting said first mode if a speed vector for an image part is an element of said subset, said speed vector being defined with reference to said subset, and for selecting said second mode if a speed vector for an image part is not an element of said subset.

2. A system as claimed in claim 1, further comprising means for, after having transmitted the characteristics of the subsets of vectors for a preceding image, transmitting for a subsequent image the characteristics of a set of variation vectors each representing the variation of one of the speed vectors in relation to the preceding image.

3. System according to claim 2, further comprising means for determining, in the set of variation vectors of said subsequent image, a second subset containing the variation vectors which are most frequently encountered in said subsequent image, means for digitally transmitting the characteristics of all the variation vectors of said second subset, each variation vector of each image part being defined by referencce to said second subset, and means for selecting, for each part of said subsequent image, either the first mode if the variation vector of an image part to be transmitted is an element of said second subset, or the second mode if the variation vector of the image part to be transmitted is not an element of said second subset.

4. A high definition television receiver, in which an image is divided into a plurality of image parts for each one of which a video data reproduction mode is determined from an indication received from a transmitter in digital form, from among at least two modes, of which at least one corresponds to the reception of a speed vector for each one of the image parts processed in that mode, characterized in that it comprises a first memory to store a plurality of speed vectors, and means for locating in said first memory the characteristics of a speed vector corresponding to an image part, from a reference received from the transmitter for this image part.

5. A receiver as claimed in claim 4, further comprising means for adding to said speed vectors stored in the first memory, quantities representing for each image the variations relative to a preceding image.

6. A receiver as claimed in claim 4, further comprising a second memory for storing a plurality of variation vectors, and means for locating in said second memory the characteristics of a variation vector corresponding to an image part, on the basis of a reference received from the transmitter for this image part.

7. A high definition television transmission method in which an image is divided into a plurality of image parts and wherein a video data transmission mode is selected for each of said image parts from at least two sampling modes which differ from one another, said sampling modes comprising a first mode operating at a first image frequency and in which a set of speed vectors is determined for a group of said image parts processed thereby, and a second mode operating at a second image frequency which is higher than said first image frequency, and wherein said speed vectors and data identifying the mode selected for each of said image parts is transmitted on a digital channel, said method comprising the steps of:
a) identifying within said set of speed vectors, a subset of vectors comprising those speed vectors which are most frequently determined in said first mode;
b) digitally transmitting the characteristics of each of the vectors comprising the subset; and
c) selecting said first mode if a speed vector for an image part is an element of said subset, said speed vector being defined with reference to said subset, and selecting said second mode if a speed vector for an image part is not an element of said subset.

8. A method as claimed in claim 7, comprising, after having transmitted the characteristics of the subset of vectors of the subset for a preceding image, the further step of transmitting for a subsequent image the characteristics of a set of variation vectors each representing the variation of one of the speed vectors in relation to the preceding image.

9. A method as claimed in claim 8, further comprising the further steps of: determining, in the set of variation vectors of said subsequent image, a second subset containing the variation vectors which are most frequently encountered in said subsequent image, digitally transmitting the characteristics of all the variation vectors of said second subset, each variation vector of each image part defined by reference to said second subset, and selecting, for each image part, either the first mode if the variation vector of an image part to be transmitted is an element of said second subset, or the second mode if the variation vector of the image part to be transmitted is not an element of said second subset.

* * * * *